2,853,502
Patented Sept. 23, 1958

2,853,502

9α HALO Δ⁴ ANDROSTENES

Gordon H. Thomas, New Brunswick, and Richard W. Thoma, Somerville, N. J., assignors to Olin Mathieson Chemical Corporation, New York, N. Y., a corporation of Virginia No Drawing. Application October 29, 1957
Serial No. 693,039

7 Claims. (Cl. 260—397.45)

This invention relates to the synthesis of valuable steroids and, more particularly, to the preparation of new steroids of the general formula

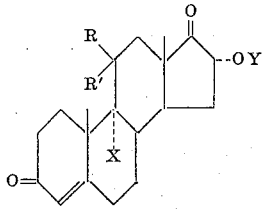

wherein R is hydrogen, R' is β-hydroxy or together R and R' is keto, X is halogen (preferably fluoro), and Y is hydrogen or acyl, particularly the acyl radical of a hydrocarbon carboxylic acid of less than ten carbon atoms.

These new steroids are physiologically active substances which possess androgenic activity. Thus, they may be administered instead of and in the same manner as testosterone propionate, for example, in the treatment of hypogonadism, for which purpose they are formulated in parenterally acceptable preparations (e. g., aqueous suspension).

The starting materials for the steroids of this invention include: 9α-halo-11β-hydroxyandrostenediones (e. g., 9α-fluoro-Δ⁴-androsten-11β-ol-3,17-dione and 9α-chloro-Δ⁴-androsten-11β-ol-3,17-dione), and 9α-halo-11-ketoandrostenediones (e. g., 9α-fluoro-Δ⁴-androstene-3,11,17-trione and 9α-chloro-Δ⁴-androstene-3,11,17-trione). These starting materials can be prepared by the method disclosed in the U. S. application of Josef Fried, Serial No. 469,848, filed November 18, 1954. To prepare the steroids of this invention, wherein Y is hydrogen, such starting materials are subjected to the action of the enzymes of *Streptomyces roseochromogenus* Waksman No. 3689 (Institute of Microbiology, Rutgers University, New Brunswick, New Jersey) in an aqueous medium containing a source of nitrogenous factors and an assimilable source of carbon and energy, in the presence of oxygen, and the 16α-hydroxy steroid formed is recovered.

The resulting 16α-hydroxy steroid (e. g., 9α-fluoro-Δ⁴-androstene - 11β,16α - diol-3,17-dione and 9α-fluoro-Δ⁴-androsten-16α-ol-3,11,17-trione) can then be esterified, if desired, in the usual manner, as by treatment with the acid anhydride or acyl halide of the desired acid in the presence of an organic base, such as pyridine. Among the suitable acid anhydrides and acyl halides may be mentioned the acid anhydride and acyl chlorides of hydrocarbon carboxylic acids of less than ten carbon atoms, as exemplified by the lower alkanoic acids (e. g. acetic, propionic and caproic acid), monocyclic aromatic carboxylic acids (e. g., benzoic and m-toluic acid), monocyclic aralkanoic acids (e. g., phenacetic and β-phenylpropionic acid), cycloalkanecarboxylic acids (e. g., cyclohexanecarboxylic acid), lower alkenoic acids, and lower cycloalkenoic acids.

The following examples are illustrative of the invention (all temperatures being in centigrade):

EXAMPLE 1

9α-fluoro-11β,16α-dihydroxyandrostenedione (a) *Fermentation.*—Eight flasks, each containing 50 ml. of the following sterilized medium (A):

|  | Grams |
| --- | --- |
| Soybean meal | 15 |
| Glucose | 10 |
| Soybean oil | 2.2 |
| CaCO₃ | 2.5 |
| Distilled water to make one liter. | | are inoculated each with 0.8 ml. of a suspension obtained by adding 8 ml. of 0.01% aqueous Duponal (a wetting agent) solution to a three-week-old slant culture of *Streptomyces roseochromogenus* Waksman No. 3689 on Bennett's agar (yeast extract, 1%; beef extract, 1%; NZ Amine A, 2%; glucose, 10%; agar, 15%). After 66 hours of incubation at 25° with rotary mechanical agitation (280 R. P. M., 2 inch radius), a 10% (vol./vol.) transfer is made to 48 flasks containing 50 ml. portions of the same sterile medium A. A total of 720 mg. of 9α-fluoro-11β-hydroxyandrostenedione is added aseptically in methanol solution containing 15 mg. of steroid/ml. The flasks are incubated for 96 hours and the contents of the flasks pooled. The contents are then adjusted to pH 4.1 with 12 N sulfuric acid and filtered through a Seitz clarifying pad with suction. The flasks and pad are washed with about five 50 ml. portions of water. The combined volume of filtrate and washings is about 2630 ml. The combined filtrate and washings is held at 15° with 100 ml. of chloroform. Paper chromatographic analyses indicates that no starting material remains.

(b) *Isolation.*—The culture filtrate and wash is extracted four times with one liter of chloroform, the combined chloroform extracts are washed with water, dried over sodium sulfate and evaporated to dryness in vacuo. Trituration of the residue with hexane yields about 440 mg. of 9α-fluoro-11β,16α-dihydroxyandrostenedione having a M. P. of about 249–268. Crystallization from chloroform-methanol gives a pure sample melting at about 280–282; [α]_D +173° (c., 0.97 in chloroform);

$\lambda_{max.}^{alc.}$ 237 mμ (ε=16,200); $\lambda_{max.}^{Nujol}$ 2.86, 2.95, 3.10, 5.72, 6.05μ.

*Analysis.*—Calcd. for C₁₉H₂₅O₄F: C, 67.83; H, 7.49; F, 5.65. Found: C, 67.70; H, 7.49; F, 5.74.

In a similar manner, by substituting 9α-chloro-11β-hydroxyandrostenedione for the 9α-fluoro-11β-hydroxyandrostenedione in the procedure of Example 1, 9α-chloro-11β,16α-dihydroxyandrostenedione is formed.

EXAMPLE 2

9α-fluoro-Δ⁴-androstene-16α-ol-3,11,17-trione

Following the procedure of Example 1, but substituting 720 mg. of 9α-fluoro-Δ⁴-androstene-3,11,17-trione for the 9α-fluoro-11β-hydroxyandrostenedione, 9α-fluoro-Δ⁴-androstene-16α-ol-3,11,17-trione is obtained.

Similarly, upon substitution of 9α-chloro-Δ⁴-androstene-3,11,17-trione for the 9α-fluoro steroid in Example 2, 9α-chloro-Δ⁴-androstene-16α-ol-3,11,17-trione is formed.

EXAMPLE 3

9α-fluoro-11β,16α-dihydroxyandrostenedione 16α-propionate

To a solution of 50 mg. of 9α-fluoro-11β,16α-dihydroxyandrostenedione in 1 ml. of pyridine is added 0.3 ml. of propionic anhydride, and the resulting solution is allowed to remain at room temperature for 18 hours. The mixture is then diluted with water, the precipitated solid collected, washed with water, dried and crystallized from acetone-hexane.

Similarly, if 9α-chloro-11β,16α-dihydroxyandrostenedione, 9α-fluoro-Δ⁴-androstene-16α-ol-3,11,17-trione, and 9α-chloro-Δ⁴-androstene-16α-ol-3,11,17-trione are substituted for the 9α-fluoro-11β,16α-dihydroxyandrostenedione in the procedure of Example 3, the respective 16α-propionate esters are formed.

Furthermore, if another acylating agent such as acetic anhydride or benzoyl chloride is substituted for the propionic anhydride in the procedure of Example 3, the respective 16α-ester is obtained.

The invention may be otherwise variously embodied within the scope of the appended claims.

What is claimed is:

1. A steroid of the general formula

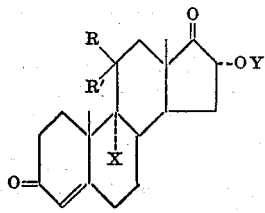

wherein R is hydrogen, R' is β-hydroxy and together R and R' is keto, X is halogen, and Y is selected from the group consisting of hydrogen and the acyl radical of a hydrocarbon carboxylic acid of less than ten carbon atoms.

2. 9α-halo-Δ⁴-androstene-11β,16α-diol-3,17-dione.
3. 9α-fluoro-Δ⁴-androstene-11β,16α-diol-3,17-dione.
4. The 16α ester of 9α-halo-Δ⁴-androstene-11β,16α-diol-3,17-dione with a hydrocarbon carboxylic acid of less than ten carbon atoms.
5. 9α - fluoro - Δ⁴ - androstene - 11β,16α - diol - 3,17 - dione 16α-propionate.
6. 9α-halo-Δ⁴-androstene-16α-ol-3,11,17-trione.
7. 9α-fluoro-Δ⁴-androstene-16α-ol-3,11,17-trione.

References Cited in the file of this patent
UNITED STATES PATENTS
2,773,080     Bernstein _____ Dec. 4, 1956